United States Patent [19]

Terashima et al.

[11] Patent Number: 5,413,521
[45] Date of Patent: May 9, 1995

[54] INNER DIAMETER SAW SLICING MACHINE

[75] Inventors: Seiichi Terashima; Masao Kita, both of Annaka, Japan

[73] Assignee: Shin-Etsu Handotai Company, Ltd., Tokyo, Japan

[21] Appl. No.: 158,856

[22] Filed: Nov. 29, 1993

[30] Foreign Application Priority Data

Nov. 27, 1993 [JP] Japan ................................. 4-319052

[51] Int. Cl.⁶ ............................................. B24B 49/00
[52] U.S. Cl. ............................................ 451/1; 451/8; 451/10; 451/67; 451/69; 125/13.01
[58] Field of Search ......................... 451/1, 5, 8, 9, 10, 451/41, 65, 67, 69; 125/13.01

[56] References Cited

U.S. PATENT DOCUMENTS

| | | | |
|---|---|---|---|
| 5,074,276 | 12/1991 | Katayama | 125/13.02 |
| 5,174,270 | 12/1992 | Katayama et al. | 125/13.02 |
| 5,287,843 | 2/1994 | Katayama et al. | 125/13.02 |

FOREIGN PATENT DOCUMENTS

| | | |
|---|---|---|
| 2624423 | 6/1989 | France . |
| 4024751 | 2/1992 | Germany . |
| 3058805 | 3/1991 | Japan . |

OTHER PUBLICATIONS

Abstract JP2134212.
Abstract JP4138209.
Abstract JP61047644.

*Primary Examiner*—Maurice Rachuba
*Attorney, Agent, or Firm*—Browdy and Neimark

[57] ABSTRACT

The open end of the nozzle 42 is positioned close to and facing the surface of the metal base 20 on the side were the portion of the semiconductor ingot is to be cut off. An electromagnetic valve 46 is provided in the passage through which compressed air is supplied to the nozzle 42. The initial position of the blade 19 is detected by the detector 50U and the counter 52 measures the distance the blade 19 travels downward from the detected position and then the comparator 56 detects the point at which the measured value matches the value set on the numeric value setting device 54. The electromagnetic valve 46 is opened to emit compressed air from the nozzle 42 after this detection, until the detection of the lower limit position of the blade 19 by the detector 50D. This compressed air travels along in the direction of the rotation of the metal base 20 to enter the notch of the partially cut portion of the semiconductor ingot 10 made by the inner circumference cutting edge 22 and to consequently blow out the liquid coolant present between the metal base 20 and the semiconductor ingot 10.

4 Claims, 6 Drawing Sheets

B-B LINE CROSS SECTION

INNER DIAMETER SAW SLICING MACHINE

BACKGROUND OF THE INVENTION

1. Field of the Invention

The present invention relates to an inner diameter saw slicing machine used for cutting semiconductor ingots.

2. Description of the Prior Art

The semiconductor ingot 10 has a cone-shaped tail portion 10b and a cone-shaped head portion 10c formed on the ends of the cylindrical body portion 10a. The semiconductor ingot 10 as shown in FIG. 5B is transported in the direction of its axis over the feed rollers 12 and 14 which are arranged in a V formation. Then it is pressed down and secured by the clamper 16 at the position shown in FIG. 5A.

In the rotor 18, the outer circumference portion of the blade 19 is held in the tension head 24. In the blade 19, an inner circumference cutting edge 22 is formed by bonding diamond abrasive grain onto the inner circumference portion of the thin ring-shaped metal base 20. For example, the thickness of the metal base 20 may be 180 μm and the thickness of the inner circumference cutting edge 22 may be 430 μm. The rotor 18 is driven and rotated by a motor not shown. When the rotor 18 is lowered in this state, the end of the semiconductor ingot 10 is cut off as shown by the two-dot chain line. During this cutting, a liquid coolant, which may be plain water or a water solution of a surface active agent, is sprayed on the inner circumference cutting edge 22 from a liquid-emitting nozzle not shown. This liquid coolant travels along the direction of the rotation of the inner circumference cutting edge 22, enters the notch of the partially cut portion of the semiconductor ingot and is spread over both sides of the metal base 20.

Because of this, when the cutting of the tail portion 10b is completed, the tail portion 10b adheres to the metal base 20 due to the film-like liquid coolant between the metal base 20 and the tail portion 10b and the rotation force of the metal base 20 is thereby communicated to the cut-off tail portion 10b via the coolant. This results in the tail portion 10b being propelled in the direction of the rotation of the metal base 20. At this time, since the degree of adhesion to the metal base 20 and the force received from the metal base 20 in the direction of its rotation become greater in proportion to the size of the contact surface of the tail portion 10b and the metal base 20, the tail portion 10b will be so propelled even when the diameter of the body portion 10a is large and also the weight of the tail portion 10b is great. The weight of the tail portion 10b varies depending upon the diameter of the body portion 10a; it typically ranges from 1.5 to 8.5 kg.

As the tail portion 10b being propelled outward presents a certain danger, a barrier 26 is provided on the side where the tail portion 10b is propelled so that the tail portion 10b hits the barrier 26 and drops down to be collected in a collection box which is located below not shown.

However, sometimes the tail portion 10b may be bounce off the barrier 26 as indicated with the arrow in the figure and on the rebound it may hit the blade 19 and deform it. This greatly reduces the service life of the blade 19.

In order to deal with this problem, the tail portion 10b is cut while it is being held by a vacuum chuck 28 in the prior art, as shown in FIG. 6.

Because there are crystal habit lines as well as protuberances and depressions on the surface of the tail portion 10b, when the tail portion 10b is to be held by the vacuum chuck 28, it is necessary to make fine adjustments of the shaft center of the vacuum chuck 28 manually for each semiconductor ingot 10, and this prevents full automation of the cutting operation.

The problems described above also occur during cutting of the head portion 10c.

SUMMARY OF THE INVENTION

Accordingly, an object of the present invention is to provide an inner diameter saw slicing machine in which the cut portion of the semiconductor ingot is prevented from hitting the blade after the cutting is completed and with which full automation of the cutting operation is possible.

The inner diameter saw slicing machine according to the present invention is described by using numbers for the components that correspond with the key numbers used in the figures illustrating the embodiment.

The present invention, as illustrated in FIG. 1 to 4 for example, is an inner diameter saw slicing machine for cutting a semiconductor ingot 10, comprising an inner diameter blade 19, an inner circumference cutting edge 22 of the blade 19 being formed on a thin ring-shaped metal base 20, the blade 19 being lowered and rotated so as to cut the semiconductor ingot 10 while a liquid coolant is sprayed on the inner circumference cutting edge, the improvement comprising: a nozzle 42, an open end of the nozzle being positioned in close proximity to and facing a surface of the metal base on a side with a portion of the semiconductor ingot 10b that is being cut off; and a control means 48–60 for supplying compressed air to the nozzle during cutting operation, whereby the compressed air emitted from the open end travels in a direction of rotation of the metal base, enters a notch of the partially cut portion of the semiconductor ingot created by the inner circumference cutting edge, and blows out the liquid coolant from between the metal base and the semiconductor ingot.

According to the present invention, since the liquid coolant between the metal base 20 and the cut portion 10b of the semiconductor ingot is blown out with the emission of compressed air from the nozzle 42, the cut portion 10b of the semiconductor ingot is inclined to separate itself after being cut, due to its own weight. The force that would otherwise act against the cut portion 10b of the semiconductor ingot separating itself from the metal base 20, that is, the adhesion to the metal base 20, does not apply. Likewise, the cut portion 10b of the semiconductor ingot is not subject to a force from the metal base 20 in the direction of its rotation. As a result, the cut portion 10b of the semiconductor ingot simply drops in the direction indicated with the arrow in FIG. 4. In this manner, the cut portion 10b of the semiconductor ingot is prevented from hitting the blade 19, thereby greatly extending the service life of the blade 19.

Also, as shown in FIG. 6 for example, when cutting the cone-shaped portions with varying surface forms, it is not necessary to hold the portion to be cut with a vacuum chuck 28 or the like or to fine-adjust the holding position manually according to the form of the portion to be cut. Therefore, it becomes possible to implement full automation of the cutting operation.

In the first aspect of the present invention, the control means 48-60 including: a valve 46 for opening and closing the passage through which compressed air is supplied to the nozzle 42; a first detection means 48, 50U, 52-56 for detecting a point of time before and near completion of cutting performed by the blade on the semiconductor ingot 10; a second detection means 50D for detecting a point of time after completion of the cutting performed by the blade on the semiconductor ingot 10; and a valve control means 58, 60 for opening the valve in response to the detection made by the first detection means and closing the valve in response to the detection made by the second detection means.

With this structure, compressed air is not required during the period of time between the start of cutting until before and near the completion of cutting, and is, therefore, more economical. Also, since emission time for the compressed air is relatively short, a number of factors causing reduced service life of the blade 19 due to a decrease in the cooling effect on the inner circumference cutting edge, such as imprecise adjustment of the mounting position of the nozzle, the force of the compressed air, the direction of emission and the dispersing of the compressed air and deviations in the air pressure are less likely to have a negative effect.

In the second aspect of the present invention, the first detection means 48, 50U, 52-56 including: a detector 50U for detecting an initial position of the blade 19 before start of cutting; a device for setting a numeric value(54); a measure for measuring a distance from the initial position to a present position of the blade; and a comparator 56 for detecting a match between the measured distance and the numeric value set.

This first detection means may have a similar structure to that presented below in the third aspect. However, according to the second aspect, the emission start time for the compressed air can be easily adjusted by changing the value setting on the numeric value setting device 54.

In the third aspect of the present invention, the second detection means is a detector 50D for detecting a specific position in the vertical direction of the blade 19.

This second detection means may have a structure in which a floodlamp and a light sensor are positioned facing each other to detect the falling cut portion of the semiconductor ingot. However, detection can be made more easily and reliably, according to this third aspect, as to the fact that the blade 19 has completely cut the semiconductor ingot 10.

DESCRIPTION OF THE PREFERRED EMBODIMENT

The following is an explanation of an embodiment in reference to the drawings.

Figure 1:
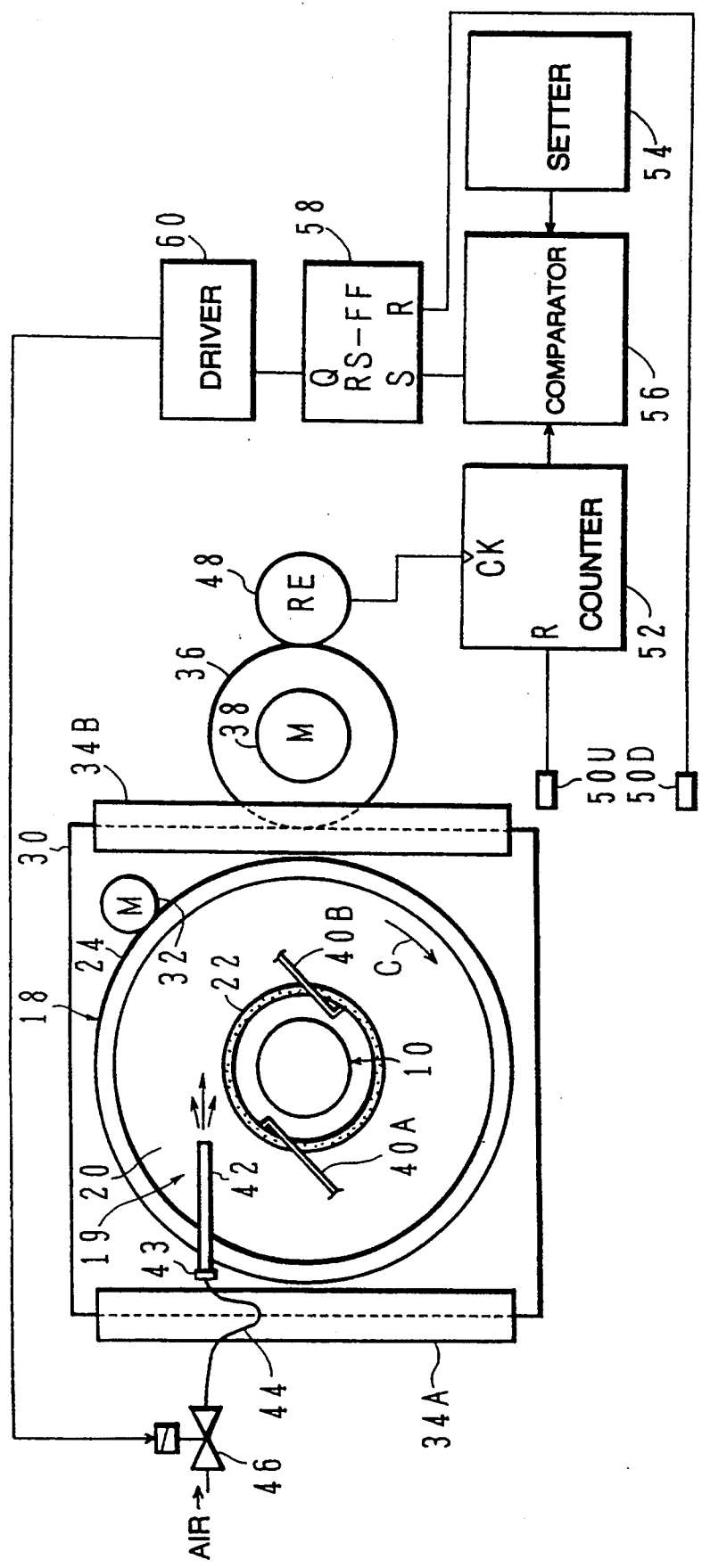
FIG. 1 is a block diagram of essential parts of an embodiment of the inner diameter saw slicing machine according to the present invention.
Figure 5A:
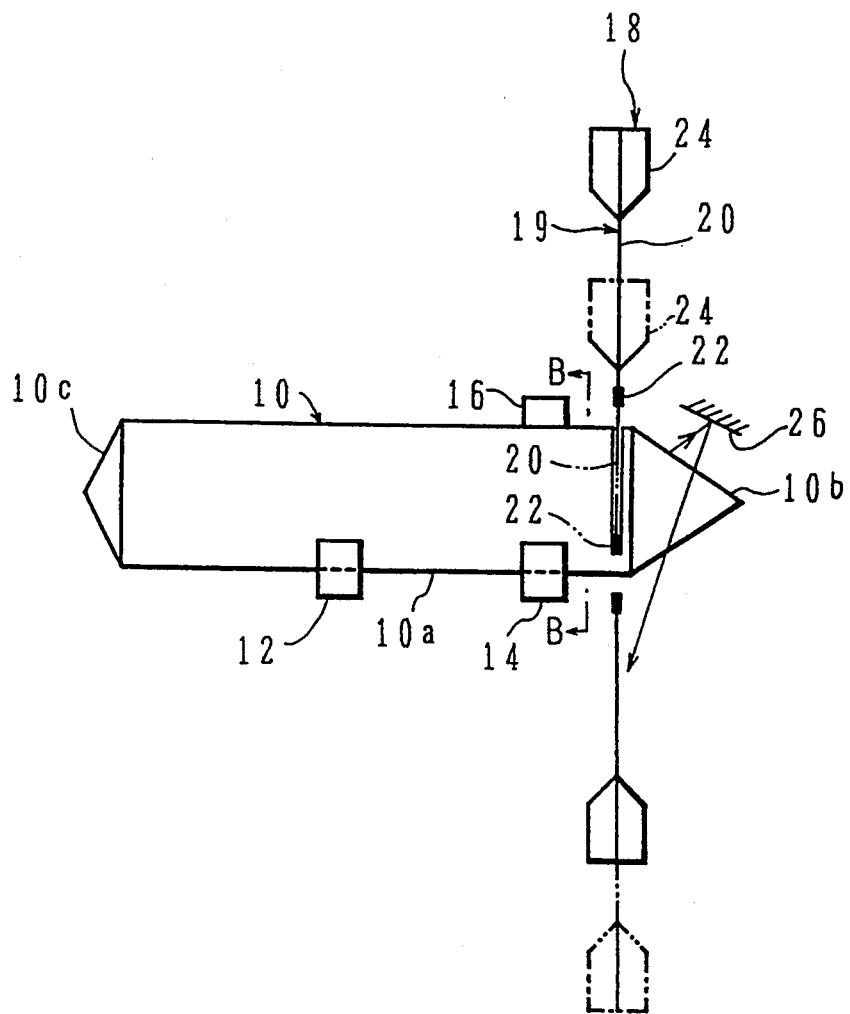
FIG. 5A is a diagram illustrating problems of the prior art.
Figure 5B:
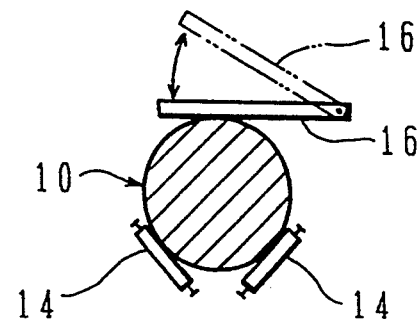
FIG. 5B is a sectional view taken on line B—B in FIG. 5A.

FIG. 1 shows the essential structure of the inner diameter saw slicing machine. The same key numbers are used for identical components in FIG. 5A.

Figure 2:
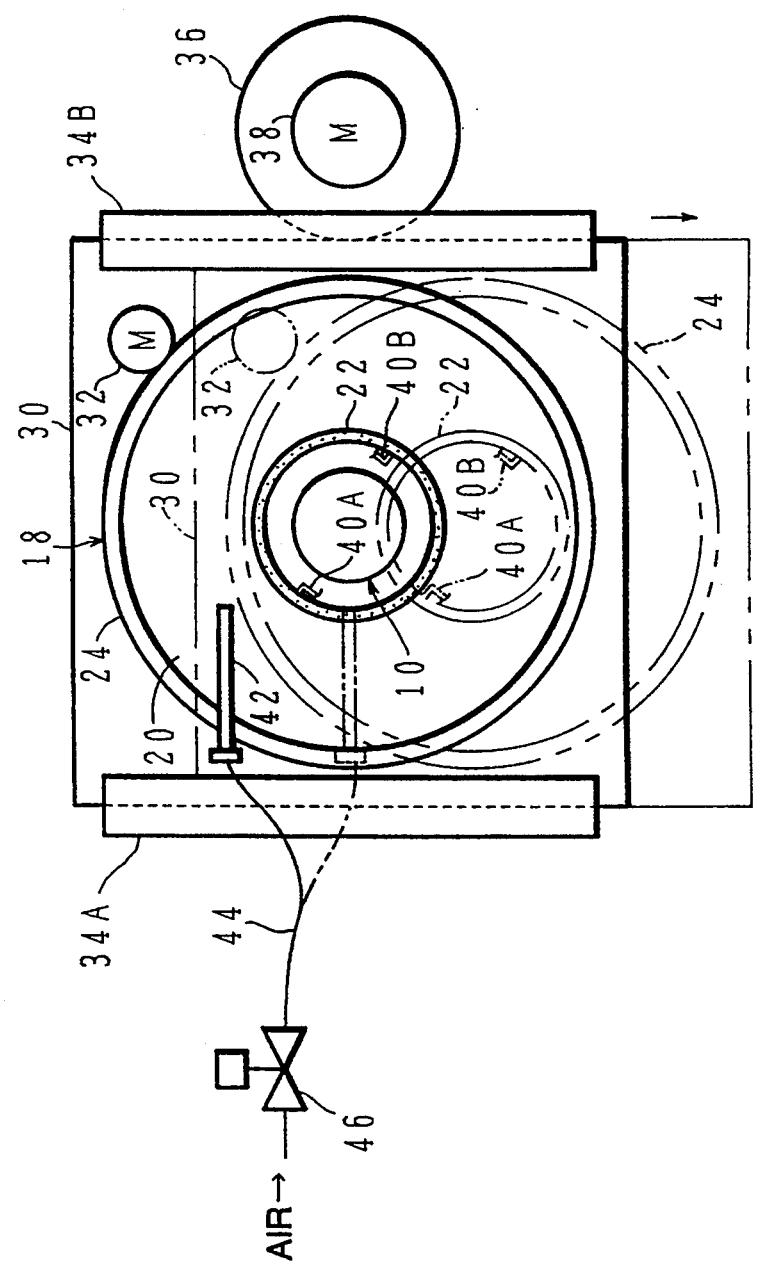
FIG. 2 is a frontal view illustrating the cutting operation.

The rotor 18 has a tension head 24 that is supported by the slider 30 in such a manner that it can rotate freely and the rotor 18 is driven and rotated in the direction of the arrow C by the motor 32 mounted on the slider 30. The rotation rate of the rotor 18 can be, for example, 1000-1500 rpm. The slider 30 is guided by the guides 34A and 34B on both sides of slider 30 so that it can travel upward and downward by the motor 38 via the speed reducer 36 as shown in FIG. 2.

The tips of the nozzle 40A for emitting the liquid coolant and the nozzle 40B for emitting cleaning liquid are arranged opposite each other with facing the inner circumference cutting edge 22. The liquid coolant and the cleaning liquid must be the same type of liquid. If water is being used, then both should be water, if a water solution with a surface active agent is being used, then both should be such a solution. The tip of the nozzle 40B for cleaning liquid emission should face in the opposite direction from the tip of the nozzle 40A for liquid coolant emission. These tips are provided with a notch not shown so that they will not contact the inner circumference cutting edge 22 even when they approach closely. The nozzles 40A and 40B are secured on the slider 30. The liquid coolant emitted from the nozzle 40A travels along in the direction of rotation of the inner circumference cutting edge 22 and cools the inner circumference cutting edge 22 by absorbing the friction heat generated from the sliding movement of the inner circumference cutting edge 22 against the semiconductor ingot 10. It also carries off the cuttings from the notch in the partially cut portion. Cuttings thus carried off are pushed outwards in the direction of the radius of the blade 19 by the cleaning liquid emitted from the tip of the nozzle 40B and are thereby prevented from re-entering the notched portion. This liquid coolant also spreads over the metal base 20 under the influence of the centrifugal force generated by the rotation, and in the condition indicated by the two point chain line in FIG. 5A, the liquid coolant bridges the gap between the metal base 20 and the tail portion 10b. With this, the tail portion 10b is subject to the force from the metal base 20 in the direction of its rotation via the liquid coolant.

Figure 3:
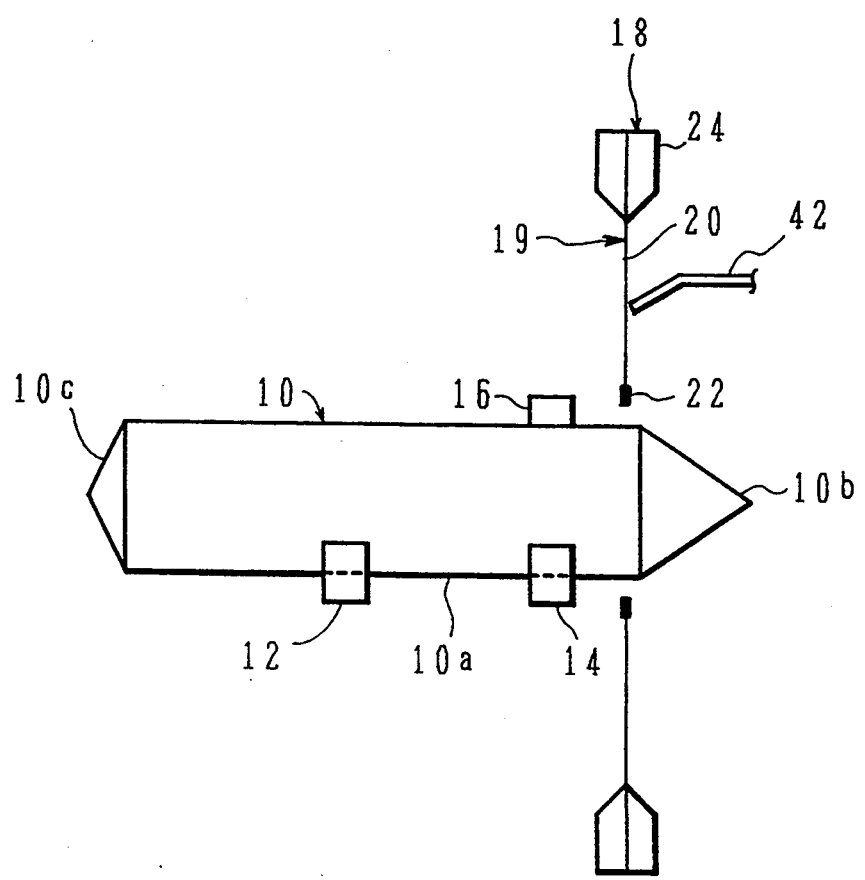
FIG. 3 is a schematic side view illustrating a state before the start of semiconductor ingot cutting by the inner diameter saw slicing machine.

The nozzle 42 is secured on to the slider 30 with the supporter 43. The tip of the nozzle 42 is positioned to face the metal base 20 (FIG. 3). The nozzle 42 is connected to the source of compressed air not shown via the flexible tube 44 and the electromagnetic valve 46.

An input shaft of the rotary encoder 48 is linked to the rotating shaft of the speed reducer 36 and the pulses are output from the rotary encoder 48 in proportion with the travel distance of the slider 30. A photo sensor 50U, that detects the lower end of the slider 30 at its initial position as shown in FIG. 1, and a photo sensor 50D that detects the lower end of the slider 30 after completion of cutting, are mounted on the fixed side.

Figure 4:
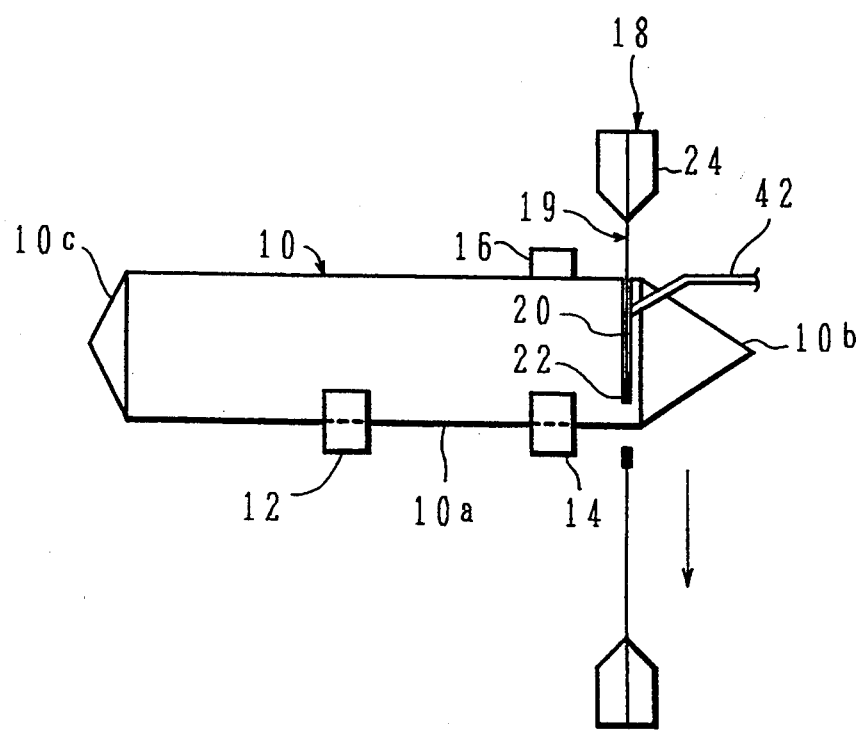
FIG. 4 is a schematic side view illustrating a state during semiconductor ingot cutting by the inner diameter saw slicing machine.

The output pulses from the rotary encoder 48 are counted on the counter 52 and the counted value is cleared when the photo sensor 50U detects the lower end of the slider 30. A value equal to the counted value on the counter 52 when, for example, the portion remaining uncut is approximately 20 mm, as shown in FIG. 4, is set on the numeric value setting device 54. The counted value on the counter 52 and the value set on the numeric value setting device 54 are fed to the comparator 56 and when the two values match, a coincidence pulse is output from the comparator 56. This coincidence pulse sets the RS flip-flop 58 and raises its Q output to high and the coil of the electromagnetic valve is driven via the driver 60. As a result, the electromagnetic valve 46 is opened. This then causes compressed air to be emitted from the tip of the nozzle 42 and the compressed air is blown onto the metal base 20 to generate an air current in the direction indicated with the arrow in the figure, and the compressed air enters the notch of the partially cut portion to blow out the liquid coolant collected between the metal base 20 and the tail portion 10b. The pressure and flow-rate of the compressed air should be set at levels whereby a sufficient quantity of liquid coolant is sprayed onto the inner circumference cutting edge 22, the liquid coolant between the metal base 20 and the tail portion 10b is blown out and at the same time the liquid coolant between the inner circumference cutting edge 22 and the tail portion 10b will not be blown out. The liquid coolant is required only to cool the inner circumference cutting edge 22 and as some of the liquid coolant collected between the metal base 20 and the tail portion 10b is pushed between the inner circumference cutting edge 22 and the tail portion 10b by the air current indicated with the arrow in the figure, this blowing out of the liquid coolant will not reduce the cooling effect on the inner circumference cutting edge 22. On the contrary, depending upon the force of the compressed air current and its distribution, the cooling effect may even be increased with the liquid coolant thus pushed. (0028)

When there is approximately 1 to 2 mm of material left uncut, the tail portion 10b tends to separate itself due to its own weight. At this point, without compressed air emitted from the nozzle 42, a force that acts to prevent the tail portion 10b from separating from the metal base 20, that is, an adhesion to the metal base 20 is in effect because of the film-like liquid coolant between the metal base 20 and the tail portion 10b. Also, the tail portion 10b is subject to a force from the metal base 20 in the direction of its rotation via this liquid coolant.

However, in this embodiment, since the liquid coolant between the metal base 20 and semiconductor ingot cut portion 10b is blown out with the emission of compressed air from the nozzle 42, such adhesion and the force in the direction of the rotation are not applied to the tail portion 10b and it simply drops in the direction indicated with the arrow in FIG. 4. Thus, the tail portion 10b is prevented from hitting the blade 19, thereby greatly for example, by 500% extending the service life of the blade 19.

Figure 6:
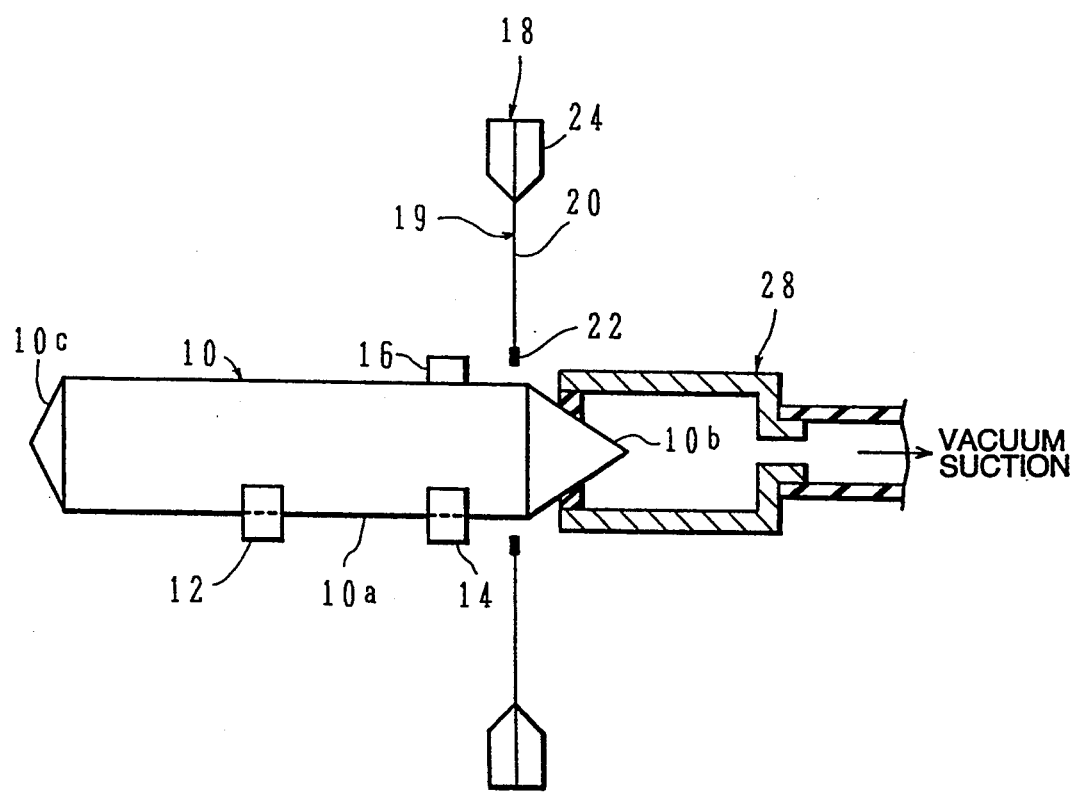
FIG. 6 is a figure illustrating prior art solutions to the problems shown in FIG. 5A.

Also, since when cutting cone-shaped portions of varying surface forms, it is not necessary to hold the portion with a vacuum chuck 28 or the like as shown in FIG. 6, or to fine-adjust the holding position manually according to the form of the particular portion to be cut. It thus becomes possible to implement full automation of the cutting operation.

Furthermore, with this embodiment, compressed air is not required during the period of time between the start of cutting until immediately before the completion of cutting. Therefore, it is more economical.

Having described specific embodiment of the present invention, it is to be understood that modification and variation of the invention are possible without departing from the spirit and scope thereof.

What is claimed is:

1. An inner diameter saw slicing machine for cutting a semiconductor ingot (10), comprising an inner diameter blade (19), an inner circumference cutting edge (22) of the blade being formed on a thin ring-shaped metal base (20), the blade (19) being lowered and rotated so as to cut the semiconductor ingot (10) while a liquid coolant is sprayed on the inner circumference cutting edge; the improvement comprising:

a nozzle (42), an open end of said nozzle being positioned in close proximity to and facing a surface of the metal base on a side with a portion of the semiconductor ingot (10b) that is being cut off; and a control means (48–60) for supplying compressed air to said nozzle during cutting operation, whereby said compressed air emitted from said open end travels in a direction of rotation of the metal base, enters a notch of the partially cut portion of the semiconductor ingot created by the inner circumference cutting edge, and blows out the liquid coolant from between the metal base and the semiconductor ingot;

wherein said control means (48–60) including:

a valve (46) for opening and closing the passage through which compressed air is supplied to said nozzle (42);

a first detection means (48, 50U, 52–56) for detecting a point of time before and near completion of cutting performed by said blade on said semiconductor ingot (10);

a second detection means (50D) for detecting a point of time after completion of the cutting performed by said blade on the semiconductor ingot (10); and a valve control means (58, 60) for opening said valve in response to said detection made by said first detection means and closing said valve in response to said detection made by said second detection means.

2. An inner diameter saw slicing machine according to claim 1 wherein said first detection means (48, 50U, 52–56) including:

a detector (50U) for detecting an initial position of said blade (19) before start of cutting;

a device for setting a numeric value(54);

a measure for measuring a distance from said initial position to a present position of said blade; and a comparator (56) for detecting a match between said measured distance and said numeric value set.

3. An inner diameter saw slicing machine according to claim 1 wherein said second detection means is a detector (50D) for detecting a specific position in a vertical direction of said blade (19).

4. An inner diameter saw slicing machine according to claim 2 wherein said second detection means is a detector (50D) for detecting a specific position in a vertical direction of said blade (19).

* * * * *